United States Patent
Kuriyagawa (10) Patent No.: US 12,054,900 B2
(45) Date of Patent: Aug. 6, 2024

(54) WORK MACHINE FOR HANDLING WORK OBJECT

(71) Applicant: HONDA MOTOR CO., LTD., Tokyo (JP)

(72) Inventor: Koji Kuriyagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1022 days.

(21) Appl. No.: 16/997,320

(22) Filed: Aug. 19, 2020

(65) Prior Publication Data

US 2020/0375091 A1    Dec. 3, 2020

Related U.S. Application Data

(63) Continuation of application No. PCT/JP2018/006909, filed on Feb. 26, 2018.

(51) Int. Cl.
*E01H 5/04* (2006.01)
*A01D 34/00* (2006.01)
(Continued)

(52) U.S. Cl.
CPC ............ *E01H 5/045* (2013.01); *A01D 34/006* (2013.01); *A01D 34/54* (2013.01);
(Continued)

(58) Field of Classification Search
CPC ......... E01H 5/076; E01H 5/065; E01H 5/045; E01H 5/04; B65G 31/04; A01D 34/006;
(Continued)

(56) References Cited

U.S. PATENT DOCUMENTS

| | | | | |
|---|---|---|---|---|
| RE390 E | * | 8/1856 | Read | A01D 43/02 |
| | | | | 56/163 |
| 3,800,448 A | * | 4/1974 | Preston | B65G 31/04 |
| | | | | 37/259 |

(Continued)

FOREIGN PATENT DOCUMENTS

EP    2020173 A1    2/2009
JP    H01-291716 A    11/1989
(Continued)

OTHER PUBLICATIONS

German Office Action for German Patent Application No. 112018007162.6 mailed Jul. 19, 2023 (partially translated).

(Continued)

*Primary Examiner* — Arpad Fabian-Kovacs
(74) *Attorney, Agent, or Firm* — Thomas| Horstemeyer, LLP (57) ABSTRACT

A work machine includes a motive portion, a work portion driven by the motive portion, a discharge path for discharging a work object obtained as a result of the work portion rotating, and a control portion for controlling the motive portion. The control portion includes a detection portion for detecting that the discharge path is clogged with the work object, and a work control portion for, upon the detection portion detecting that the discharge path is clogged with the work object, controlling the work portion and performing an elimination operation for eliminating the clogging with the work object in the discharge path.

10 Claims, 7 Drawing Sheets

(51) Int. Cl.
*A01D 34/54* (2006.01)
*A01D 43/063* (2006.01)
*B65G 31/04* (2006.01)
*E01H 5/06* (2006.01)
*E01H 5/07* (2006.01)
*A01D 101/00* (2006.01)

(52) U.S. Cl.
CPC ......... *A01D 43/0631* (2013.01); *B65G 31/04* (2013.01); *E01H 5/04* (2013.01); *E01H 5/065* (2013.01); *E01H 5/076* (2013.01); *A01D 2101/00* (2013.01)

(58) Field of Classification Search
CPC .... A01D 34/54; A01D 34/74; A01D 43/0631; A01D 75/187; A01D 2101/00
See application file for complete search history.

(56) References Cited

U.S. PATENT DOCUMENTS

| | | | | |
|---|---|---|---|---|
| 4,916,837 A * | 4/1990 | Olmr | ........................ | E01H 5/04 37/251 |
| 5,325,650 A | 7/1994 | Fuse | | |
| 7,797,915 B1 * | 9/2010 | Kallara | .................. | A01D 34/62 701/67 |
| 9,469,953 B1 * | 10/2016 | Sherman | ................. | E01H 5/098 |
| 2006/0021315 A1 * | 2/2006 | Brandon | ................ | A01D 34/74 56/14.7 |
| 2011/0166705 A1 * | 7/2011 | Anderson | ............ | A01D 75/185 901/50 |
| 2016/0295797 A1 * | 10/2016 | Ito | ........................ | A01D 34/006 |
| 2018/0310471 A1 * | 11/2018 | Pellenc | ................ | A01D 34/828 |
| 2022/0007570 A1 * | 1/2022 | Foster | .................... | A01D 34/78 |
| 2022/0007571 A1 * | 1/2022 | Foster | .................. | G05D 1/0274 |
| 2022/0312672 A1 * | 10/2022 | Kowalewski | ........ | A01D 34/008 |
| 2022/0408638 A1 * | 12/2022 | Ito | .......................... | A01D 34/78 |

FOREIGN PATENT DOCUMENTS

| | | |
|---|---|---|
| JP | H05-123029 A | 5/1993 |
| JP | H05-55086 B2 | 8/1993 |
| JP | H05-35160 Y2 | 9/1993 |
| JP | H05-244810 A | 9/1993 |
| JP | H06-233608 A | 8/1994 |
| JP | 2005213766 A | 8/2005 |
| JP | 2005323512 A | 11/2005 |
| JP | 2008029286 A | 2/2008 |
| WO | WO-9204817 A1 * | 4/1992 ............. A01D 69/02 |
| WO | WO-2015040987 A1 * | 3/2015 ........... A01D 34/008 |
| WO | 2019163120 A1 | 8/2019 |

OTHER PUBLICATIONS

International Search Report for PCT/JP2018/006909 mailed May 15, 2018.

IPRP for PCT/JP2018/006909 mailed Nov. 7, 2019.

* cited by examiner

WORK MACHINE FOR HANDLING WORK OBJECT

CROSS-REFERENCE TO RELATED APPLICATION(S)

This application is a continuation of International Patent Application No. PCT/JP2018/006909 filed on Feb. 26, 2018, the entire disclosures of which is incorporated herein by reference.

TECHNICAL FIELD

The present invention relates to a work machine.

BACKGROUND ART

A lawn mower is a work machine for mowing lawn grass by rotating a cutter blade using an engine or a motor. The mown lawn grass passes through a discharge duct due to conveying wind, which is generated due to the cutter blade rotating, and is discharged to a grass collection box. The weight of lawn grass after rain increases due to the moisture, and the discharge duct is clogged with this lawn grass. According to Patent Literature 1, a lawn mower is proposed in which a clogging sensor for detecting a clogging with lawn grass is provided to notify a user of the clogging with lawn grass.

CITATION LIST

Patent Literature

PTL 1: Japanese Patent Laid-Open No. 2005-323512

SUMMARY OF INVENTION

Technical Problem

According to Patent Literature 1, the lawn mower notifies the user of a clogging with lawn grass, and thus the user manually eliminates the clogging with lawn grass. This mechanism may lack usability. The same problem also occurs in a snow blower, for example.

Solution to Problem

For example, the present invention provides a work machine including:
a motive portion;
a work portion driven by the motive portion;
a lifting portion for raising and lowering the work portion;
a discharge path for discharging a work object obtained as a result of the work portion rotating; and
a control portion for controlling the motive portion,
the control portion including:
  a detection portion for detecting that the discharge path is clogged with the work object; and
  a work control portion for, upon the detection portion detecting that the discharge path is clogged with the work object, controlling the work portion and performing an elimination operation for eliminating the clogging with the work object in the discharge path,
wherein the work control portion performs the elimination operation including controlling the lifting portion to repeatedly raise and lower the work portion.

Advantageous Effects of Invention

According to the present invention, a work machine capable of eliminating a clogging with a work object is provided. Thus, elimination work of the user is reduced, and accordingly, the usability of the work machine improves.

DESCRIPTION OF EMBODIMENTS

Hereinafter, an embodiment of the present invention will be described with reference to the attached drawings. Note that the diagrams are schematic diagrams that show a structure or a configuration of the embodiment, and the dimensions of each part shown in the diagrams do not necessarily reflect the actual dimensions. In the diagrams, like elements are assigned like reference numerals, and a redundant description is simplified or omitted.

Work Machine

Figure 1:
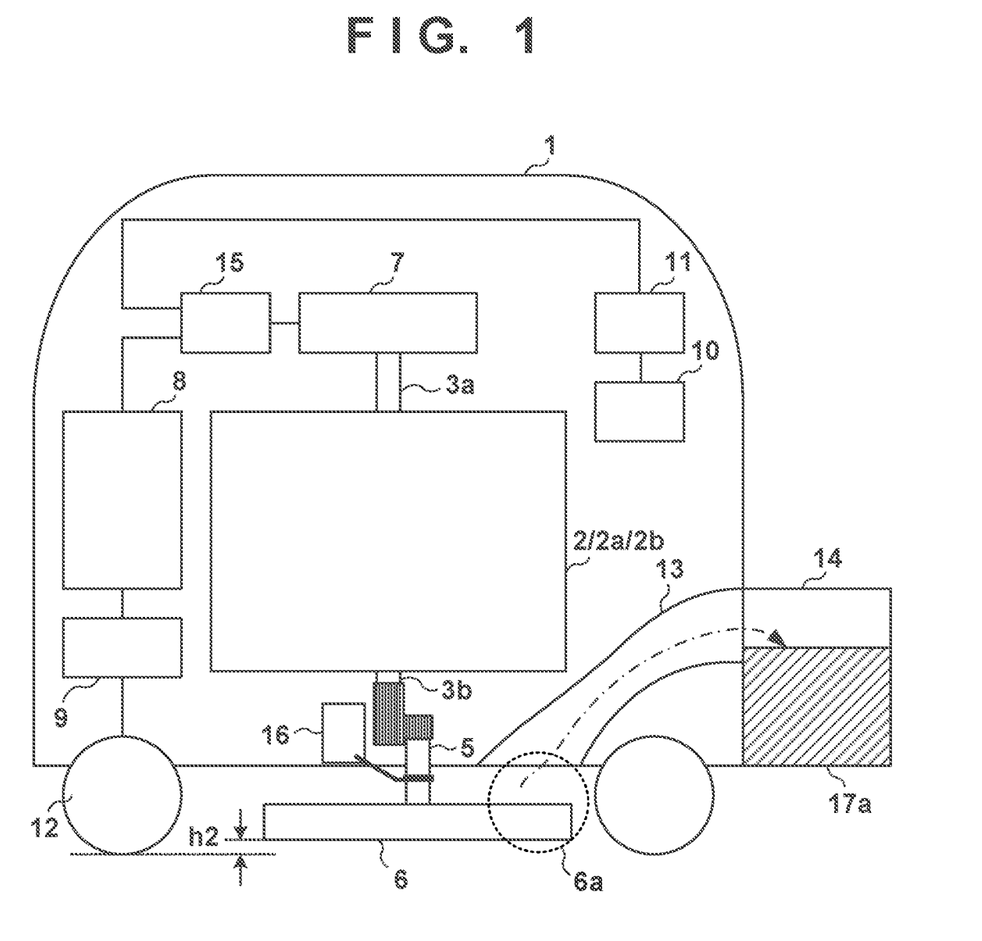
FIG. 1 is a cross-sectional view illustrating an example configuration of a work machine.
Figure 2:
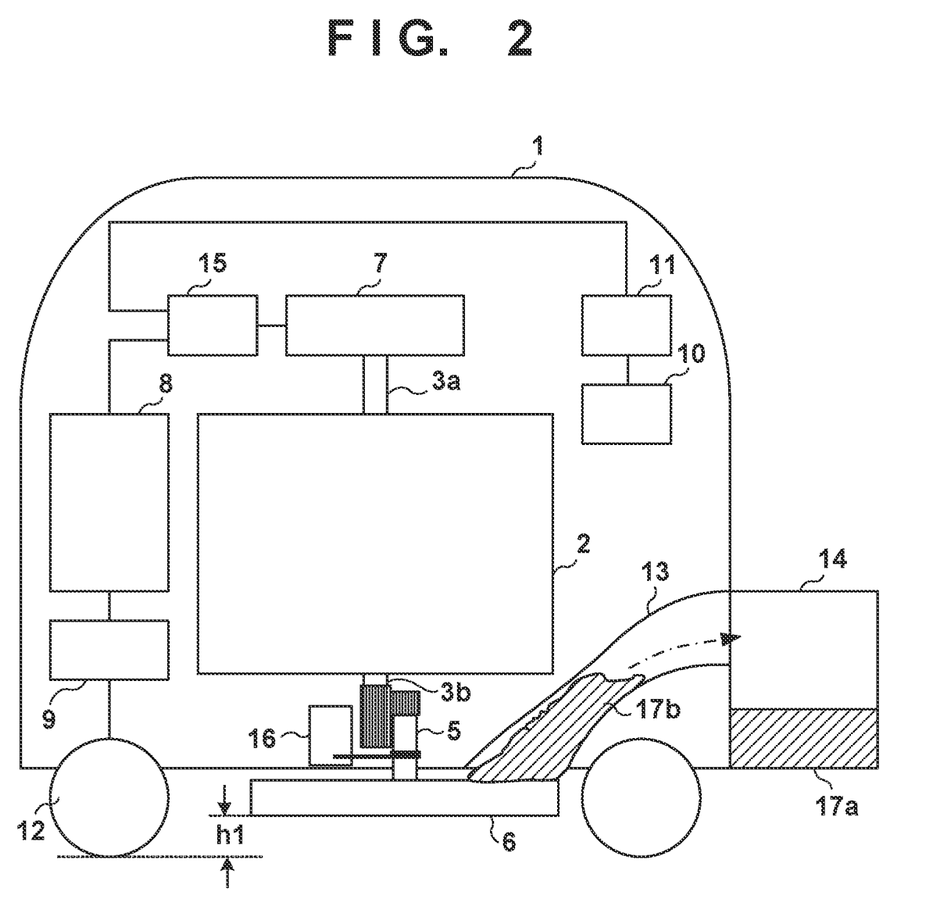
FIG. 2 is a cross-sectional view illustrating an example configuration of the work machine.

FIGS. 1 and 2 are cross-sectional views of a work machine according to the embodiment. Here, a lawn mower 1 is employed as an example of the work machine. The lawn mower 1 may be of any of a remote type that is remotely operated by a user, an autonomous-traveling type that does not require user operation, a walking type that is pushed from the rear of the lawn mower 1 by the user, and a ride-on type on which the user rides to operate the lawn mower 1.

The lawn mower 1 has an engine 2. The engine 2 has a crankshaft 3a that protrudes upward (rearward) from the engine 2, and a crankshaft 3b that protrudes downward (forward) from the engine 2. The crankshafts 3a and 3b are coupled or integrated with each other within the engine 2, and rotate together. The crankshaft 3b is an output shaft of the engine 2.

A blade 6 is an example of a work portion and has a cutter blade for mowing lawn grass, which is a work object. Lawn grass is mown due to the blade 6 being driven by the engine 2 to rotate. The mown lawn grass is pushed out to a chute 13 by an air current (conveying wind) that is generated due to the blade 6 rotating, passes through the chute 13, and is collected into a containing portion 14. The chute 13 forms a lawn grass discharge path. According to FIG. 1, lawn grass 17a is contained in the containing portion 14. Note that a space between the blade 6 and a housing of the lawn mower 1 is also a kind of discharge path.

A BSG 7 is an electric power generator-curn-motor that starts the engine 2 by driving the crankshaft 3a of the engine 2, and is driven by the started engine 2 to generate power. "BSG" is an abbreviation of a belt-starter generator. The BSG 7 transmits motive power to the crankshaft 3a via a transmission mechanism such as a belt or a gear, and receives motive power of the crankshaft 3a via the transmission mechanism. A power supply circuit 15 includes circuits (an ACDC converter, an inverter, a DCDC converter) for converting AC voltage generated by the BSG 7 to DC voltage and charging a 48-V battery 8 and a 12-V battery 11. Thus, when the BSG 7 operates as an electric power generator, the 48-V battery 8 and the 12-V battery 11 are charged with electric power generated by this electric power generator. The 48-V battery 8 supplies electric power to a travel motor 9. The travel motor 9 drives wheels 12 to rotate. The 48-V battery 8 is an example of a battery that, when the BSG 7 operates as a motor, supplies electric power to this motor. A control portion 10 may supply electric power from the 48-V battery 8 to the BSG 7 to drive the engine 2 to start (starter function), and also assist the engine 2 after starting (torque assist function). The 12-V battery 11 supplies electric power to the control portion 10.

A lifting device 16 is an adjustment portion that adjusts the ground height of the work portion. The lifting device 16 may indirectly raise and lower the blade 6 by adjusting the distance between an axle of the wheels 12 and the housing of the lawn mower 1 using the motor. As shown in FIGS. 1 and 2, the lifting device 16 may directly raise and lower the blade 6 using an actuator such as a motor. According to FIG. 1, the height (ground height) from the ground to the bottom surface of the blade 6 is h2. According to FIG. 2, the ground height of the blade 6 is h1 (h1>h2).

As shown in FIG. 2, if lawn grass is mown using the lawn mower 1 in a lawn after rain, wet lawn grass 17b sticks to the chute 13 and causes a clogging with lawn grass. Conventionally, a clogging with lawn grass is manually eliminated by the user, and therefore there has been a lack of usability. Particularly, in the case of a lawn mower whose blade 6 needs to be removed or whose containing portion 14 needs to be removed from the body of the lawn mower 1, removal of clogging lawn grass is a heavy burden on the user.

Control System

Figure 3:
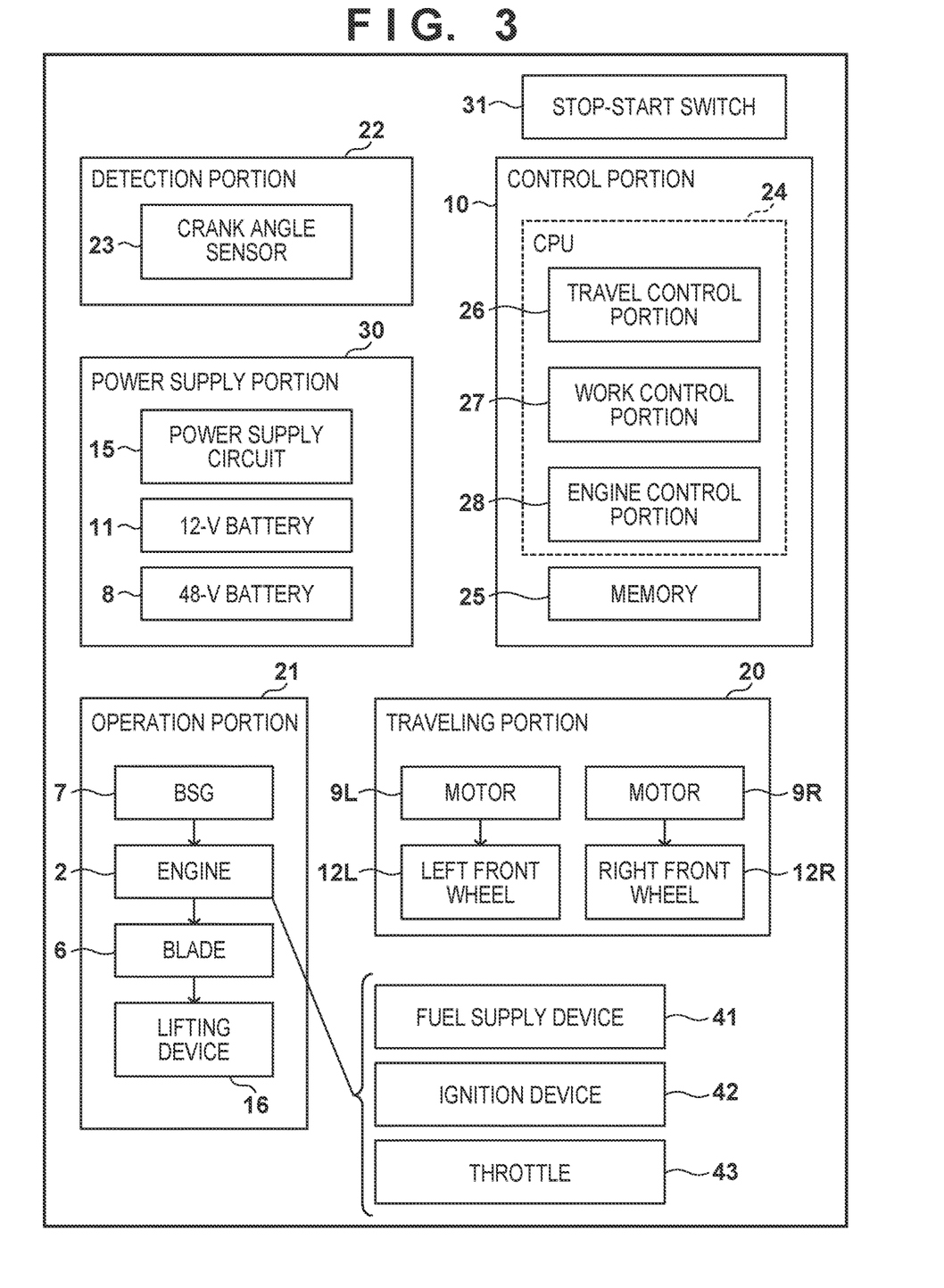
FIG. 3 is a block diagram illustrating a control system of the work machine.

FIG. 3 shows a control system of the work machine. The control portion 10 has a CPU 24 and a memory 25, which may include a RAM, a ROM, or the like. Note that the CPU 24 may have one or more processors. The ROM in the memory 25 stores a control program, for example. The CPU 24 has a travel control portion 26, a work control portion 27, and an engine control portion 28. The travel control portion 26 controls a traveling portion 20 to cause the lawn mower 1 to travel. The traveling portion 20 has a travel motor 9L that drives a wheel 12L, which is provided on a front-left side of the lawn mower 1, and a travel motor 9R that drives a wheel 12R, which is provided on a front-right side of the lawn mower 1. Note that a wheel that is provided on a rear-left side of the lawn mower 1 and a wheel that is provided on a rear-right side thereof may be driven by the travel motors 9L and 9R in place of, or together with the left-front wheel 12L and the right-front wheel 12R. The lawn mower 1 can be turned by rotating different wheels 12 respectively by the travel motors 9L and 9R. For example, if the rotational speed of the wheel 12L is lower than the rotational speed of the wheel 12R, the lawn mower 1 turns left. The lawn mower 1 also turns if the rotational direction of the wheel 12L differs from the rotational direction of the wheel 12R. The work control portion 27 controls an operation portion 21. The operation portion 21 has the BSG 7, the engine 2, the blade 6, and the lifting device 16. The engine control portion 28 controls a fuel supply device 41 to supply the fuel to the engine 2 and shut off the fuel supply, and controls an ignition device 42 to ignite an air fuel mixture that is compressed in a cylinder of the engine 2. The engine control portion 28 adjusts the opening angle of a throttle 43 in accordance with a load applied to the engine 2. For example, if the load applied to the engine 2 increases, the engine control portion 28 may also increase the opening angle of the throttle 43.

A power supply portion 30 has the power supply circuit 15, the 12-V battery 11, and the 48-V battery 8. The voltage supplied by the 12-V battery 11 and the 48-V battery 8 is merely an example. The 12-V battery 11 and the 48-V battery may be integrated into a single battery.

A detection portion 22 has a crank angle sensor 23 that detects a rotation angle (crank angle) of the crankshaft 3b of the engine 2. The engine control portion 28 detects or calculates the engine speed of the engine 2 based on a pulse signal output by the crank angle sensor 23. The crank angle sensor 23 may also be called an engine speed sensor since it can indirectly detect the engine speed of the engine 2.

The control portion 10 starts and stops the engine 2 based on the ON and OFF state of a stop-start switch 31.

Figure 4:
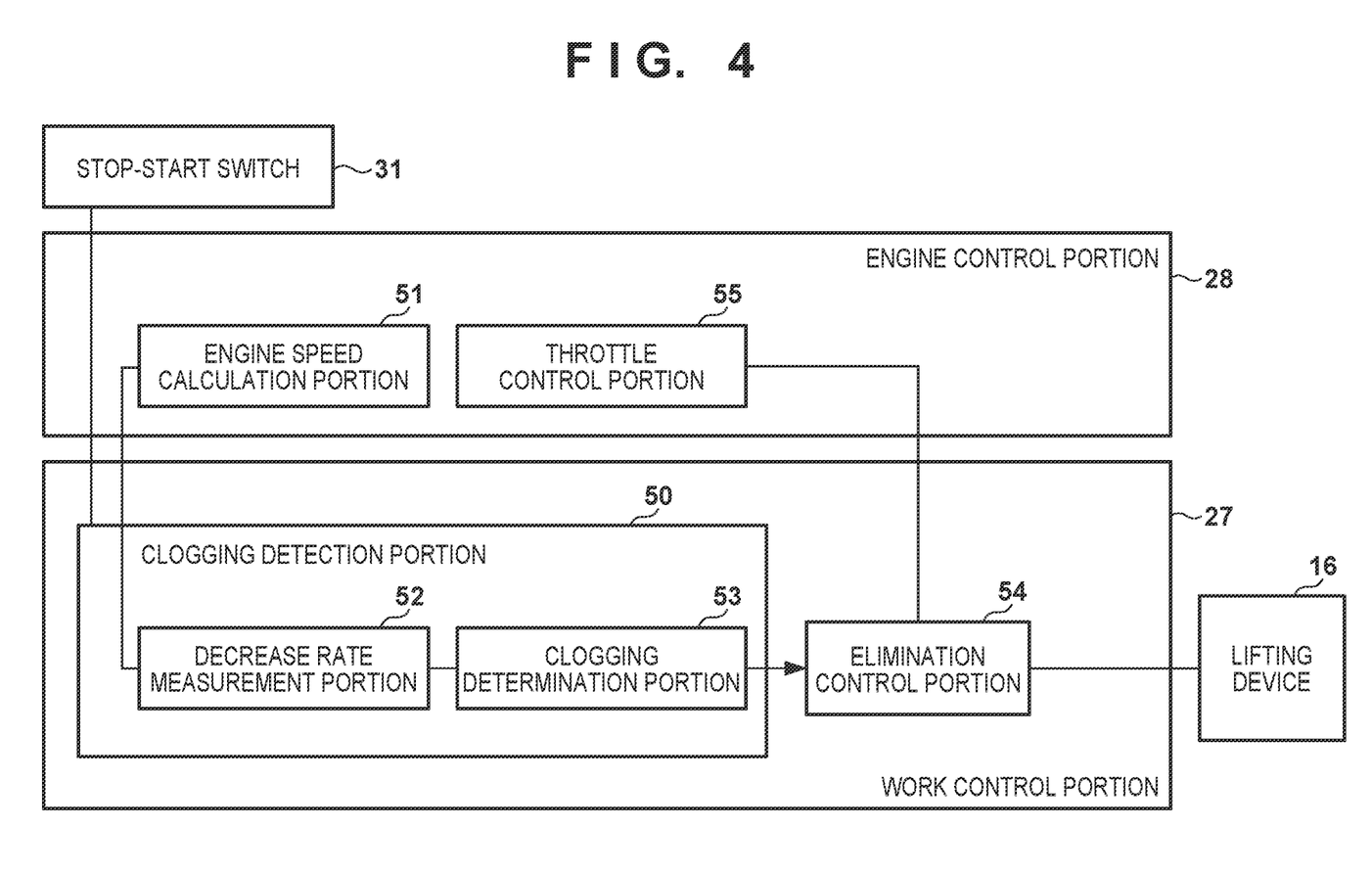
FIG. 4 is a block diagram illustrating the control system of the work machine.

FIG. 4 shows the details of the work control portion 27 and the engine control portion 28. In the engine control portion 28, an engine speed calculation portion 51 calculates the engine speed of the engine 2 based on the pulse signal output by the crank angle sensor 23. A throttle control portion 55 adjusts the opening angle of the throttle 43 in accordance with the load applied to the engine 2. For example, the throttle control portion 55 may periodically change the number of rotations of the blade 6 by repeatedly increasing and decreasing the opening angle of the throttle 43.

In the work control portion 27, a clogging detection portion 50 detects an occurrence of a clogging with lawn grass, based on the engine speed of the engine 2. For example, the clogging detection portion 50 may have a decrease rate measurement portion 52 and a clogging determination portion 53. The decrease rate measurement portion 52 measures a decrease rate of the number of rotations of the work portion (blade 6) based on the engine speed obtained by the engine speed calculation portion 51. The decrease rate is, for example, an absolute value of the inclination of the engine speed with a negative sign. If the decrease rate is small, the number of rotations is moderately decreasing. If the decrease rate is large, the number of rotations is sharply decreasing. If the decrease rate measured by the decrease rate measurement portion 52 exceeds a first threshold, the clogging determination portion 53 determines that the chute 13 is clogged with the work object (lawn grass etc.). That is to say the clogging determination portion 53 determines that the discharge path is clogged with the work object if the number of rotations of the work portion is moderately decreasing. If the decrease rate measured by the decrease rate measurement portion 52 exceeds a second threshold, the clogging determination portion 53 determines that the chute 13 is clogged with an obstacle (rock, dead tree branch, etc.). The second threshold is greater than the first threshold. That is to say, the clogging determination portion 53 determines that the work portion is in contact with an obstacle if the number of rotations of the work portion is sharply decreasing.

If the clogging detection portion 50 detects a clogging with lawn grass, an elimination control portion 54 performs an elimination operation to eliminate the clogging with lawn grass. For example, the elimination control portion 54 may control the lifting device 16 to raise the blade 6 to a predetermined position (e.g. the first ground height h1) and rotate the blade 6. The elimination control portion 54 may also control the throttle 43 through the throttle control portion 55 to vary the number of rotations of the blade 6 and pulsate the blade 6. The elimination control portion 54 may also control the lifting device 16 to repeatedly raise and lower the blade 6. Note that, if a clogging with lawn grass is detected, the elimination control portion 54 may stop and restart the engine 2. Then, the elimination control portion 54 may perform any of the elimination operations. Here, although some elimination operations are described as examples, two or more of the elimination operations may be combined. For example, two or more elimination operations may be performed in parallel on a time axis, or may be performed in series. Note that if the number of rotations of the work portion is sharply decreasing (i.e. if it is determined that an obstacle is in contact with the work portion), the elimination control portion 54 may stop the engine 2 without performing any elimination operation. Thus, the engine 2 and the blade 6 will be able to be protected from the obstacle.

Flowchart

Figure 5:
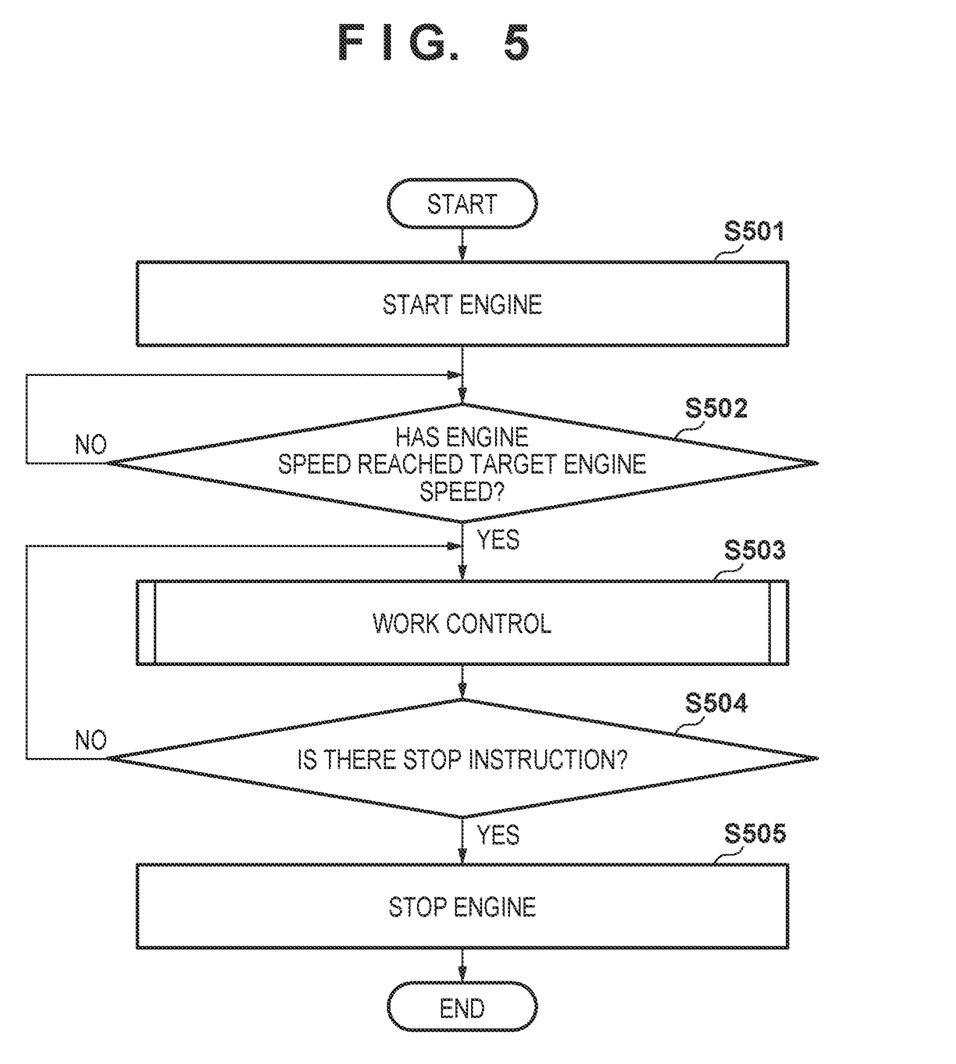
FIG. 5 is a flowchart showing a method for controlling the work machine.

FIG. 5 shows a control method that is performed in accordance with a control program by the CPU 24.

In step S501, the CPU 24 (engine control portion 28) starts the engine 2 upon being instructed to start the engine 2 by the user. For example, the engine control portion 28 sets the opening angle of the throttle 43 to an opening angle for start, sets the operation mode of the BSG 7 to a starter mode, controls the fuel supply device 41 to start supplying the fuel to the engine 2, and causes the ignition device 42 to ignite in accordance with an ignition timing. Upon the engine 2 starting, the engine control portion 28 sets the opening angle of the throttle 43 to an opening angle for work.

In step S502, the CPU 24 (engine control portion 28) determines whether or not the engine speed has reached a target engine speed. The target engine speed is an engine speed (work engine speed) that is suitable for the work portion to perform predetermined work on the work object. If the engine speed obtained by the engine speed calculation portion 51 reaches the target engine speed, the CPU 24 proceeds to step S503. Note that, if the engine speed reaches the target engine speed, the CPU 24 sets the operation mode of the BSG 7 to a power generation mode.

In step S503, the CPU 24 (work control portion 27) performs work control. The details of the work control will be described later with reference to FIG. 6.

In step S504, the CPU 24 (engine control portion 28) determines whether or not an instruction to stop the engine 2 has been given by the user. If an instruction to stop the engine 2 has not been given, the CPU 24 returns to step S403 and continues the work control. On the other hand, if the user gives an instruction to stop the engine 2 by operating the stop-start switch 31, the CPU 24 proceeds to step S505.

In step S505, the CPU 24 (engine control portion 28) stops the engine 2 by causing the fuel supply device 41 to stop supplying the fuel to the engine 2 and causing the ignition device 42 to stop ignition.

Work Control

Figure 6:
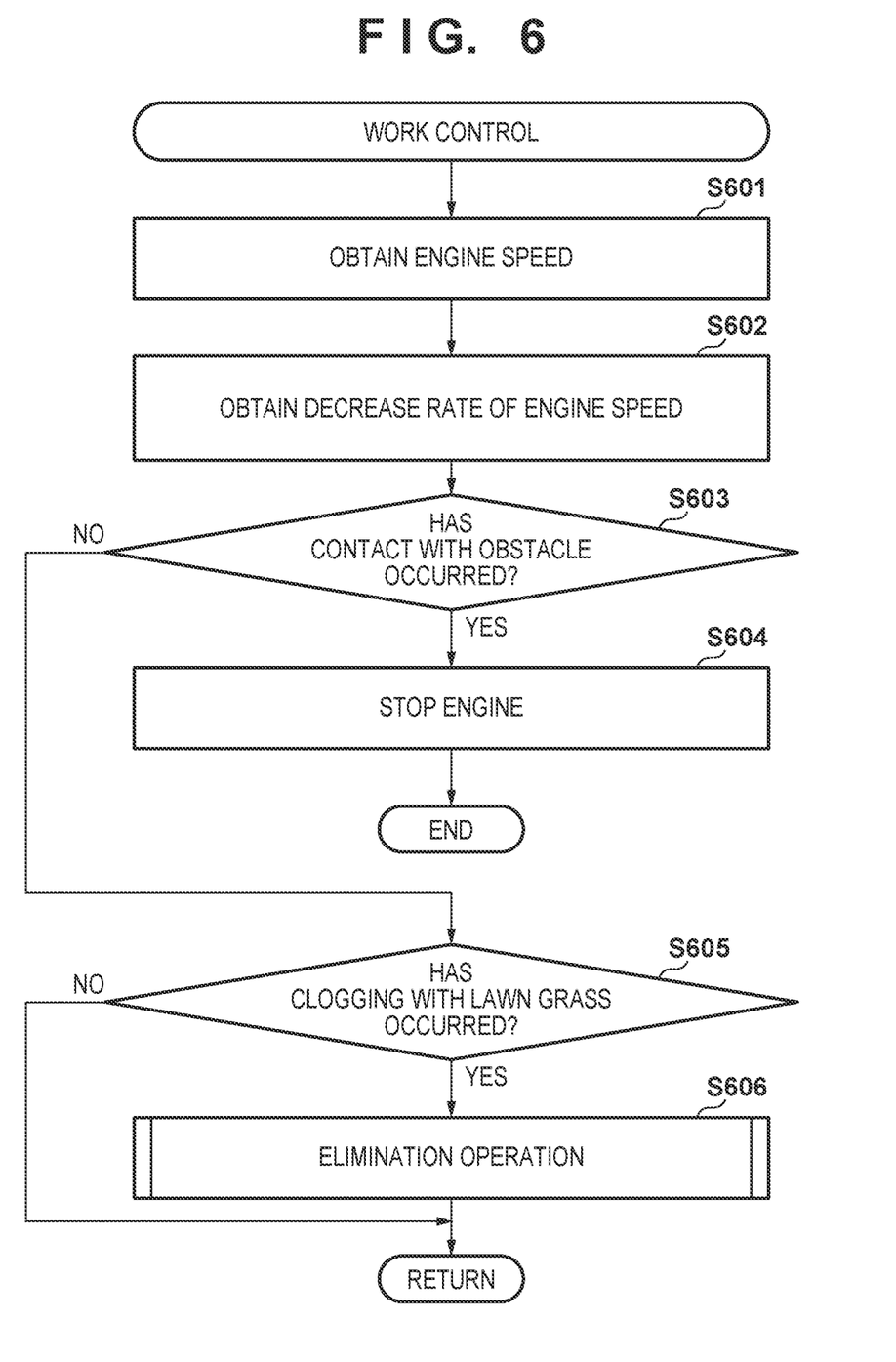
FIG. 6 is a flowchart showing the details of work control.

FIG. 6 is a flowchart showing the details of the work control performed in accordance with the control program by the CPU 24.

In step S601, the CPU 24 (engine speed calculation portion 51) obtains the engine speed of the engine 2 based on the pulse signal output by the crank angle sensor 23.

In step S602, the CPU 24 (decrease rate measurement portion 52) obtains the decrease rate of the number of rotations. If a clogging with lawn grass occurs, or if an obstacle comes into contact with the blade 6, the load applied to the engine 2 increases, and the number of rotations decreases.

In step S603, the CPU 24 (clogging determination portion 53) determines whether or not contact with an obstacle has occurred, based on the decrease rate of the number of rotations. For example, if the decrease rate exceeds the second threshold, the clogging determination portion 53 determines that contact with an obstacle has occurred. If the decrease rate does not exceed the second threshold, the clogging determination portion 53 determines that contact with an obstacle has not occurred. If contact with an obstacle has occurred, the CPU 24 proceeds to step S604. If contact with an obstacle has not occurred, the CPU 24 proceeds to step S605.

In step S604, the CPU 24 (engine control portion 28) stops the engine 2 by causing the fuel supply device 41 to stop supplying the fuel to the engine 2 and causing the ignition device 42 to stop ignition. Thus, if an obstacle is in contact with the blade 6, the engine 2 may be stopped without the elimination operation being performed.

In step S605, the CPU 24 (clogging determination portion 53) determines whether or not a clogging with lawn grass has occurred, based on the decrease rate of the number of rotations. For example, the clogging determination portion 53 determines that a clogging with lawn grass has occurred if the decrease rate exceeds the first threshold. If the decrease rate does not exceed the first threshold, the clogging determination portion 53 determines that a clogging with lawn grass has not occurred. If a clogging with lawn grass has occurred, the CPU 24 proceeds to step S606. If a clogging with lawn grass has not occurred, the CPU 24 returns to step S601.

In step S606, the CPU 24 (elimination control portion 54) performs the elimination operation to eliminate the clogging with lawn grass.

Elimination Operation

Figure 7:
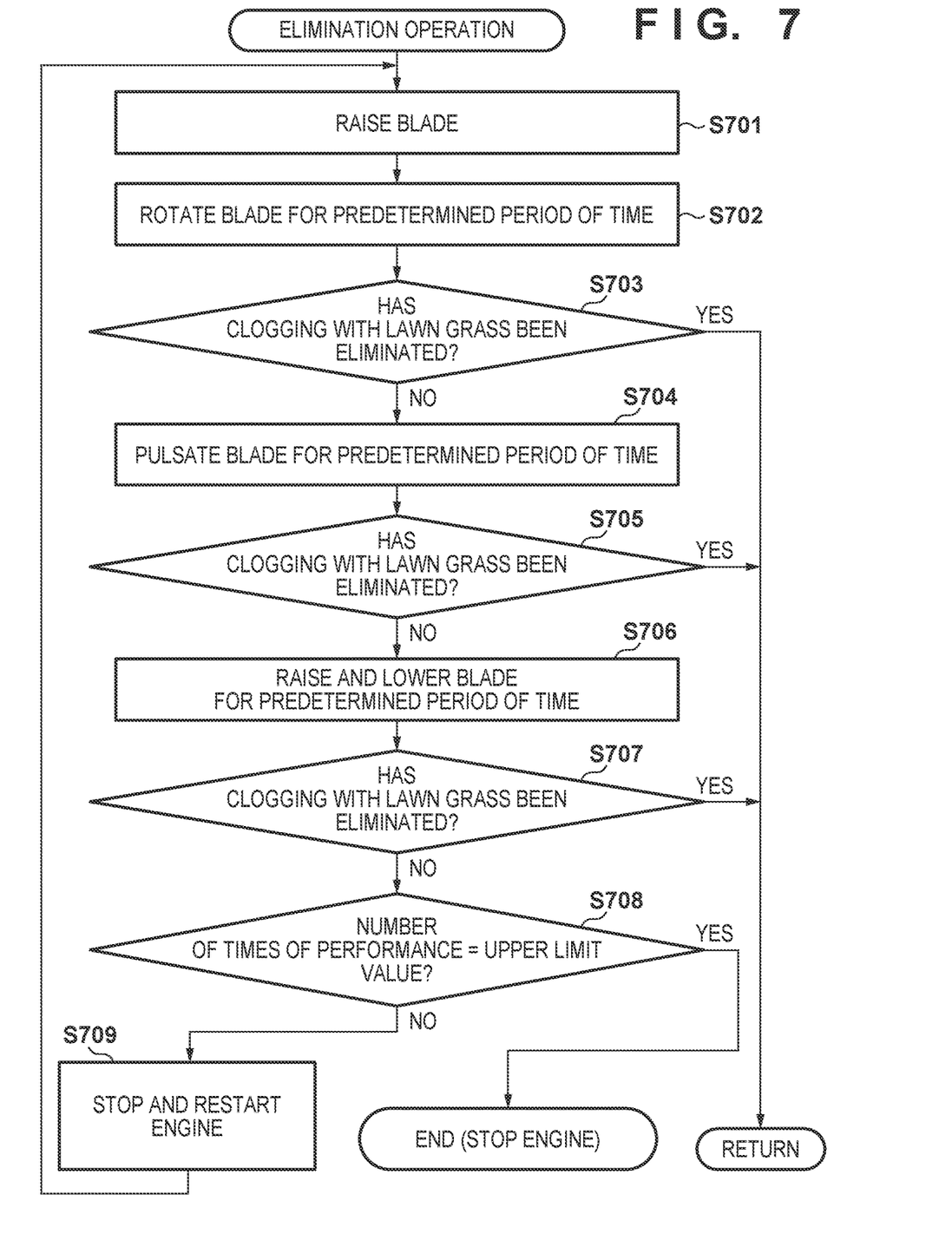
FIG. 7 is a flowchart showing elimination operations.

FIG. 7 is a flowchart showing the details of the elimination operations performed in accordance with the control program by the CPU 24. Although four types of elimination operations are performed in time series here, one or more of the four types of elimination operations need only be performed. There are 24 combination patterns of the four types of elimination operations, if consideration is also given to the order of performing a plurality of elimination operations. Note that a pattern may also be employed in which one of the four types of elimination operations is performed n times, and another one of the elimination operations is performed m times (m≈n). In this case, an infinite number of patterns exists.

In step S701, the CPU 24 (elimination control portion 54) controls the lifting device 16 to raise the blade 6.

In step S702, the CPU 24 (elimination control portion 54) fixes the ground height of the blade 6 to a first ground height h1, and rotates the blade 6 for a predetermined period of time. The engine speed at this time may be the work engine speed.

In step S703, the CPU 24 (clogging determination portion 53) determines whether or not the clogging with lawn grass in the chute 13 has been eliminated, based on the decrease rate or the like. If the clogging with lawn grass has been eliminated, the CPU 24 ends the elimination operation. On the other hand, if the clogging with lawn grass has not been eliminated, the CPU 24 proceeds to step S704. Note that the clogging determination portion 53 may alternatively determine whether or not the clogging with lawn grass has been eliminated, based on the relationship between the opening angle of the throttle 43 and the engine speed of the engine 2. If the clogging with lawn grass has not been eliminated, the engine speed of the engine 2 does not increase as expected even if the opening angle of the throttle 43 is increased. This phenomenon may be utilized to determine whether or not the clogging with lawn grass has been eliminated.

In step S704, the CPU 24 (elimination control portion 54) controls the engine 2 through the throttle control portion 55 to pulsate the blade 6. Upon receiving a pulsation instruction, the throttle control portion 55 controls the opening angle of the throttle 43 such that the engine speed of the engine 2 repeatedly increases and decreases. After pulsating the blade 6 for a predetermined period of time, the elimination control portion 54 proceeds to step S705.

In step S705, the CPU 24 (clogging determination portion 53) determines whether or not the clogging with lawn grass in the chute 13 has been eliminated, based on the decrease rate or the like. If the clogging with lawn grass has been eliminated, the CPU 24 ends the elimination operation. On the other hand, if the clogging with lawn grass has not been eliminated, the CPU 24 proceeds to step S706.

In step S706, the CPU 24 (elimination control portion 54) controls the lifting device 16 to raise and lower the blade 6 for a predetermined period of time. For example, the lifting device 16 may raise and lower the blade 6 between the first ground height h1 and a second ground height h2. The second ground height h2 is, for example, a height of lawn grass set by the user.

In step S707, the CPU 24 (clogging determination portion 53) determines whether or not the clogging with lawn grass in the chute 13 has been eliminated, based on the decrease rate or the like. If the clogging with lawn grass has been eliminated, the CPU 24 ends the elimination operation. On the other hand, if the clogging with lawn grass has not been eliminated, the CPU 24 proceeds to step S708.

In step S708, the CPU 24 (elimination control portion 54) determines whether or not the number of times that the elimination operation is performed has reached an upper limit value. Every time steps S701 to S707 is performed, the CPU 24 adds 1 to the number of times that the elimination operation is performed. If the number of times that the elimination operation is performed has not reached the upper limit value, the processing proceeds to step S709. If the number of times that the elimination operation is performed has reached the upper limit value, the CPU 24 outputs a warning or the like and stops the engine 2.

In step S709, the CPU 24 (elimination control portion 54) stops and then restarts the engine 2 through the engine control portion 28. Then, the CPU 24 returns to step S701. Note that, in the process of proceeding from S709 to S701 as well, the CPU 24 (clogging determination portion 53) may also determine whether or not the clogging with lawn grass in the chute 13 has been eliminated, based on the decrease rate or the like.

SUMMARY

According to a first aspect, a work machine including: a motive portion (e.g.: engine 2, BSG 7); a work portion (e.g.: blade 6, auger 6a) driven by the motive portion; a discharge path (e.g.: chute 13) for discharging a work object obtained as a result of the work portion rotating; and a control portion 10 for controlling the motive portion. The control portion 10 includes: a detection portion (e.g.: clogging detection portion 50) for detecting that the discharge path is clogged with the work object; and a work control portion (e.g.: work control portion 27) for, if the detection portion detects that the discharge path is clogged with the work object, controlling the work portion and performing an elimination operation for eliminating the clogging with the work object in the discharge path. Thus, a work machine capable of eliminating a clogging with the work object is provided. Furthermore, the user less often eliminates a clogging with lawn grass manually, and accordingly, usability of the work machine is improved.

According to a second aspect, the work machine may further include a lifting portion (e.g.: lifting device 16) for raising and lowering the work portion. The work control portion may perform the elimination operation including controlling the lifting portion to raise the work portion to a predetermined position (e.g.: first ground height h1) and rotating the work portion. If the work machine is the lawn mower 1, lawn grass that is deposited between the blade 6 and the bottom face of the lawn mower 1 can be scraped off by rotating the blade 6 while raising the blade 6. It is also expected that the deposited lawn grass is also removed by conveying wind generated by the blade 6.

According to a third aspect, the work control portion may perform the elimination operation including pulsating the work portion by varying the number of rotations of the work portion. If the work machine is the lawn mower 1, vibration occurs on the blade 6 as a result of pulsating the blade 6, and this vibration will allow the clogging lawn grass to loosen.

According to a fourth aspect, the work control portion may perform the elimination operation including controlling the lifting portion to repeatedly raise and lower the work portion. If the work machine is the lawn mower 1, vibration can be applied to clogging lawn grass by repeatedly raising and lowering the blade 6, and elimination of a clogging with lawn grass is accelerated.

According to a fifth aspect, if the detection portion detects that the discharge path is clogged with the work object, the work control portion may stop the motive portion, restart the motive portion, and perform the elimination operation. If the work machine is the lawn mower 1, the rotation of the blade 6 is stopped by stopping the engine 2. Thus, damage to the blade 6 and the engine 2 caused by a clogging with lawn grass will be mitigated. In addition, if the engine 2 is restarted, the engine 2 significantly vibrate, and this vibration is then propagated to the clogging lawn grass. Thus, elimination of the clogging with lawn grass is accelerated.

According to a sixth aspect, the detection portion may include: a measurement portion (e.g. decrease rate measurement portion 52) for measuring a decrease rate of the number of rotations of the work portion; and a determination portion (e.g.: clogging determination portion 53) for determining that the discharge path is clogged with the work object, if the decrease rate measured by the measurement portion exceeds a threshold. This configuration eliminates the necessity to attach a dedicated sensor for detecting a clogging to the chute 13. That is to say, the manufacturing cost is reduced. Note that the CPU 24 may detect a clogging with lawn grass using a clogging sensor provided in the chute 13.

According to a seventh aspect, the detection portion may include a determination portion for determining that the discharge path is clogged with the work object if the number of rotations of the work portion is moderately decreasing, and determining that an obstacle is in contact with the work portion if the number of rotations of the work portion is sharply decreasing. If the determination portion determines that the discharge path is clogged with the work object, the work control portion may perform the elimination operation. If the determination portion determines that an obstacle is in contact with the work portion, the work control portion may stop the motive portion without performing the elimination operation. Thus, if an obstacle is in contact with the work portion, the user can be urged to eliminate the obstacle. Also, if an obstacle is in contact with the work portion, the work portion is protected by skipping the elimination operation.

According to an eighth aspect, the motive portion includes at least one of an engine 2 and a motor 2a. According to FIG. 1, the engine 2 is employed as a motive portion of the work machine. However, a motor 2a may also be employed instead of or together with the engine 2.

According to a ninth aspect, the motor 2a may be an electric power generator-curn-motor 2b. The electric power generator-curn-motor 2b, such as the BSG 7, functions as an electric power generator and also as a starter motor.

According to a tenth aspect, the work portion may be a blade for mowing lawn grass.

According to an eleventh aspect, the work portion may be an auger 6a for scooping snow up. In a snow blower, there may also be cases where a discharge path is clogged with snow scraped off by an auger 6a. For this reason, the aforementioned elimination operation may also be performed for the auger 6a. The above description of the lawn mower 1 serves as a description of a snow blower by replacing lawn grass with snow and also replacing the blade 6 with an auger 6a in the above description.

The invention claimed is:

1. A work machine comprising:
    a motive portion;
    a work portion driven by the motive portion;
    a lifting portion for raising and lowering the work portion;
    a discharge path for discharging a work object obtained as a result of the work portion rotating; and
    a control portion for controlling the motive portion, the control portion including:
        a detection portion for detecting a clog caused by the work object in the discharge path; and
        a work control portion for, upon the detection portion detecting the clog caused by the work object in the discharge path, controlling the work portion and performing an elimination operation for eliminating the clog caused by the work object in the discharge path,
    wherein the work control portion performs the elimination operation including controlling the lifting portion to repeatedly raise and lower the work portion.

2. The work machine according to claim 1, wherein the work control portion performs the elimination operation including controlling the lifting portion to raise the work portion to a predetermined position and rotating the work portion.

3. The work machine according to claim 1, wherein the work control portion performs the elimination operation including pulsating the work portion by varying the number of rotations of the work portion.

4. The work machine according to claim 1, wherein upon the detection portion detecting the clog caused by the work object in the discharge path, the work control portion stops the motive portion, restarts the motive portion, and performs the elimination operation.

5. The work machine according to claim 1, wherein
    the detection portion includes:
        a measurement portion for measuring a decrease rate of the number of rotations of the work portion; and
        a determination portion for determining the clog caused by the working object in the discharge path, upon the decrease rate measured by the measurement portion exceeding a threshold.

6. The work machine according to claim 1, wherein
    the detection portion includes a determination portion for determining the clog caused by the working object in the discharge path in a case where the number of rotations of the work portion is moderately decreasing, and determining that an obstacle is in contact with the work portion in a case where the number of rotations of the work portion is sharply decreasing, and
    upon the determination portion determining the clog caused by the working object in the discharge path, the work control portion performs the elimination operation, and upon the determination portion determining that an obstacle is in contact with the work portion, the work control portion stops the motive portion without performing the elimination operation.

7. The work machine according to claim 1, wherein the motive portion includes at least one of an engine and a motor.

8. The work machine according to claim 7, wherein the motor is an electric power generator-curn-motor.

9. The work machine according to claim 1, wherein the work portion is a blade for mowing lawn grass.

10. The work machine according to claim 1, wherein the work portion is an auger for scooping snow up.

* * * * *